Feb. 27, 1923.
T. S. SCOTT.
RESILIENTLY MOUNTED ARMATURE.
FILED FEB. 15, 1919.
1,447,046.
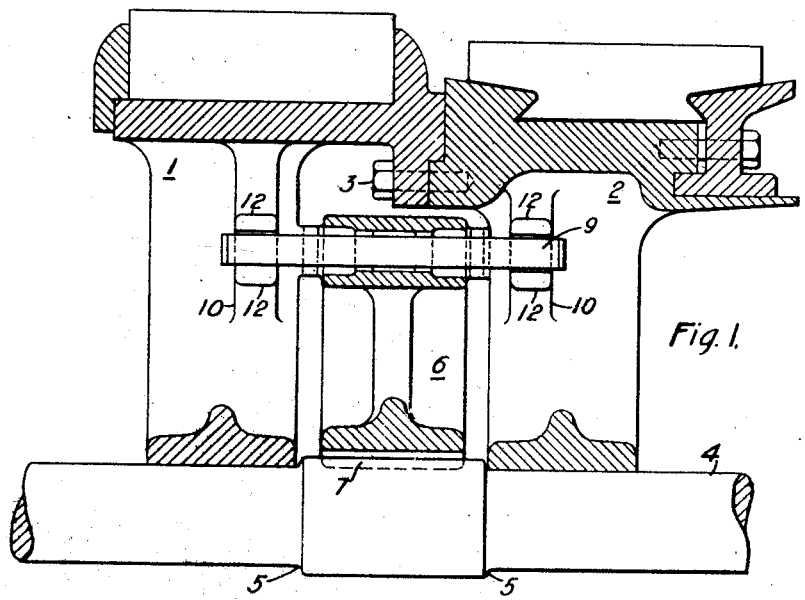
Fig. 1.
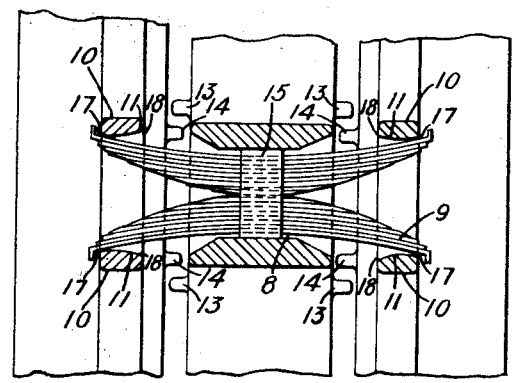
Fig. 2.
Fig. 3.
WITNESSES:
H. T. Shelhamer
F. M. Biebel
INVENTOR
Thomas S. Scott
BY
Chesley G. Carr
ATTORNEY Patented Feb. 27, 1923.

1,447,046

UNITED STATES PATENT OFFICE.

THOMAS S. SCOTT, OF PITTSBURGH, PENNSYLVANIA, ASSIGNOR TO WESTINGHOUSE ELECTRIC & MANUFACTURING COMPANY, A CORPORATION OF PENNSYLVANIA.

RESILIENTLY-MOUNTED ARMATURE.

Application filed February 15, 1919. Serial No. 277,312.

*To all whom it may concern:*

Be it known that I, THOMAS S. SCOTT, a citizen of the United States, and a resident of Pittsburgh, in the county of Allegheny and State of Pennsylvania, have invented a new and useful Improvement in Resiliently-Mounted Armatures, of which the following is a specification.

My invention relates to motors and particularly to flexible connecting devices between the rotors and the driving shafts of large railway motors.

One object of my invention is to provide a device for preventing shocks, caused by the action of the gears, from being transmitted to the rotor windings, with consequent danger of injury to the insulation.

A further object of my invention is to provide a flexible connection between the rotor of a single-phase railway motor and the driven shaft so that small variations in the torque of such motor may not be transmitted to the gears and cause excessive noise and wear of the gear teeth.

Various forms of flexible connections between driving shafts and gear wheels have been devised but these have been usually in the form of springs between the rim of the gear wheel and its hub. The space available for such springs is relatively small, and their action in taking up shocks caused by the gears is, consequently, not as efficient as is desired. The mounting and replacing of the springs in the small space available is also a difficult operation.

In practicing my invention, I provide an armature spider and a commutator spider so bolted together as to preclude any relative angular movement of the same. These spiders are so mounted on a shaft, without keys, that they may turn freely thereon, but shoulders on the shaft, or other suitable means, preclude longitudinal movement on the shaft. I provide also a driven spider keyed rigidly to the same shaft and disposed between the armature spider and the commutator spider and a plurality of double back-to-back cantilever springs rigidly mounted in the driven spider and frictionally engaging the other spiders. By this construction, the rotative movement of the armature is transmitted to the driven shaft through the cantilever springs and the driven spider; consequently, variations in the rotative movement of the armature are precluded from reaching the gears. The cantilever springs will take up shocks caused by the gear teeth and thus protect the rotor windings against such shocks.

Figure 1 of the drawing is a longitudinal sectional view of a portion of a motor embodying my invention, Fig. 2 is a view, partly in plan and partly in section, of a portion of the motor shown in part in Fig. 1, and Fig. 3 is a plan view of the springs shown in Fig. 2, and adjusting means to be utilized in mounting the same.

In Fig. 1, an armature spider 1 and a commutator spider 2 are rigidly bolted together by a plurality of bolts 3 and are so mounted on a shaft 4 that they may turn thereon. The spiders are precluded from longitudinal movement on the shaft 4 by means of shoulders 5 or other suitable means. A driven spider 6 is mounted between the shoulders 5 intermediate the spiders 1 and 2 and is fastened to the shaft 4 by means of a key 7. The spiders 1 and 2 are provided with radial arms, and the spider 6 is provided with spaces 8 that alternate with the radial arms and are so shaped as to receive double back-to-back cantilever springs 9. Lugs 10 are provided on the radial arms of each of the spiders 1 and 2, having seats 11 for frictionally engaging the ends of the double back-to-back cantilever springs 9. The lugs 10 are provided with bosses 12 between which the ends of the springs 9 are located to preclude radial movement of the same. The seats 11 are so shaped that only the outer ends of the springs make engagement therewith when a relatively small torque is being transmitted. As the transmitted torque increases, engagement between the springs and the seats 11 is so changed by reason of the bending of the springs and the curvature of the seats 11, as to shorten the active moment arms of the springs and preclude dangerously high strains therein. The driven spider 6 is provided with stop lugs 13 and the other spiders are provided with similar lugs 14 to limit the relative angular movement of the spiders and also to act as a positive driving means in case of failure of the springs 9.

The double back-to-back cantilever springs 9 are of the commercial type used on locomotives and are held in their assembled positions by retaining bands 15. Turnbuckle clamps 16 may be used to draw the outer ends of the springs toward each other so that the assembled springs may be placed in their proper positions in the spiders.

In assembling the device, the driven spider 6 may be mounted on the shaft 4 between the shoulders 5 and be rigidly fastened in place by means of the key 7. The spiders 1 and 2 are then so placed on the shaft 4 as to occupy their proper positions and so that the spaces between the lugs 10 of the spiders 1 and 2 shall be in alinement with the spaces 8 in the spider 6, and the two spiders 1 and 2 may then be bolted together by the bolts 3.

The dimension A across the outer ends of the springs 9, (see Fig. 3) may now be made slightly smaller than the width of the space 8, and the springs be placed in position in the spiders. When the retaining band 15 is in the position shown in Fig. 2, the turnbuckle clamps 16 may be removed to permit the springs to take the positions shown in Fig. 2. The two outer leaves of the springs 9 will engage the seats 11 at their outer edges 17 when the armature is not rotating or when it is transmitting only a relatively small torque. When the transmitted torque is increased, the bending of the springs 9 causes the line of engagement between the springs 9 and the seats 11 to shift toward the driven spider 6 and decrease the lengths of the active moment arms. At a relatively large torque, the springs will be in engagement with the inner edge 18 of the seats 11 and, if the torque becomes still larger, the stop lugs 13 and 14 will come into engagement to protect the springs 9 against any further increase of strain, while also operating to transmit the torque from the armature to the driven shaft.

If the springs 9 should break while the armature is rotating, the stop members 13 and 14 would transmit the torque and enable operation to be continued until new springs could be mounted in place.

Various modifications of the device may be made without departing from the spirit and scope of my invention, and I desire that only such limitations shall be imposed as are indicated in the appended claims.

I claim as my invention:

1. In a dynamo-electric machine, the combination with a shaft and an armature spider and a commutator spider loosely mounted thereon, of a driven spider rigidly mounted on said shaft between the armature spider and the commutator spider, and means for ensuring simultaneous rotation of said spiders.

2. In a dynamo-electric machine, the combination with a shaft and an armature spider and a commutator spider rigidly connected together and loosely mounted thereon, of a driven spider rigidly mounted on said shaft, and a cantilever spring member rigidly mounted in the driven spider and variably engaged by said armature and commutator spiders.

3. In a dynamo-electric machine, the combination with a shaft and an armature spider and a commutator spider rigidly connected together and loosely mounted on said shaft, each of said spiders having radial arms provided with driving seats, of a driven spider rigidly mounted on said shaft and having a plurality of radial arms provided with seats, and resilient means cooperating with the said seats to maintain proper relative longitudinal alinement of all of said spiders.

4. In a dynamo-electric machine, the combination with a shaft and an armature spider and a commutator spider rigidly connected together and loosely mounted on said shaft, of a driven spider rigidly mounted on said shaft, and spring units severally comprising a pair of back-to-back cantilever springs rigidly mounted in said driven spider and adapted to yieldably engage the armature and the commutator spiders.

5. In a dynamo-electric machine, the combination with a shaft and an armature spider and a commutator spider mounted thereon, of a driven spider mounted on said shaft, a spring member connecting said driven spider to said armature spider and said commutator spider, and means for causing the stress in said spring member to increase more rapidly than the strain thereon.

6. In a dynamo-electric machine, the combination with a shaft and an armature spider and a commutator spider mounted on said shaft, of a driven spider mounted on said shaft, spring members mounted on said driven spider, engaging means for said spring members carried by said armature and commutator spiders, the surfaces of which are adapted to shorten the active moment arms of said spring members with an increase in the deflection thereof, and vice versa.

7. In a dynamo-electric machine, the combination with a shaft and an armature spider and a commutator spider mounted on said shaft, of a driven spider mounted on said shaft, a plurality of back-to-back double cantilever springs mounted in said driven spider and yieldably engaging said armature spider and said commutator spider, the line of engagement at light loads being near the ends of each spring member and moving inwardly as the load is increased, whereby the active moment arm of the springs is decreased with an increase of load, and vice versa.

8. In a dynamo-electric machine, the combination with a shaft and an armature spider and a commutator spider mounted on said shaft, of a driven spider mounted on said shaft, a plurality of back-to-back double cantilever springs mounted in said driven spider and yieldably engaging said armature and commutator spiders, stop members on said spiders adapted to come into engagement when said spring members are deflected more than a predetermined amount, whereby the overstraining of said spring members is prevented.

9. In a dynamo-electric machine, the combination with a shaft and an armature spider and a commutator spider mounted on said shaft, of a driven spider mounted on said shaft, a plurality of back-to-back double cantilever springs mounted in said driven spider and yieldably engaging said armature and commutator spiders, said springs normally tending to have a greater width than the mounting therefor and adapted to be compressed for reducing the width of said springs sufficiently to permit their insertion into said mounting.

10. In a dynamo-electric machine, the combination with a shaft and an armature spider and a commutator spider loosely mounted on said shaft, of a driven spider rigidly mounted on said shaft, a plurality of back-to-back double cantilever springs, a binding member encircling the two bundles of spring leaves, and means for rigidly mounting said springs in said driven spider.

In testimony whereof, I have hereunto subscribed my name this 31st day of Jan. 1919.

THOMAS S. SCOTT.